Patented Sept. 23, 1947

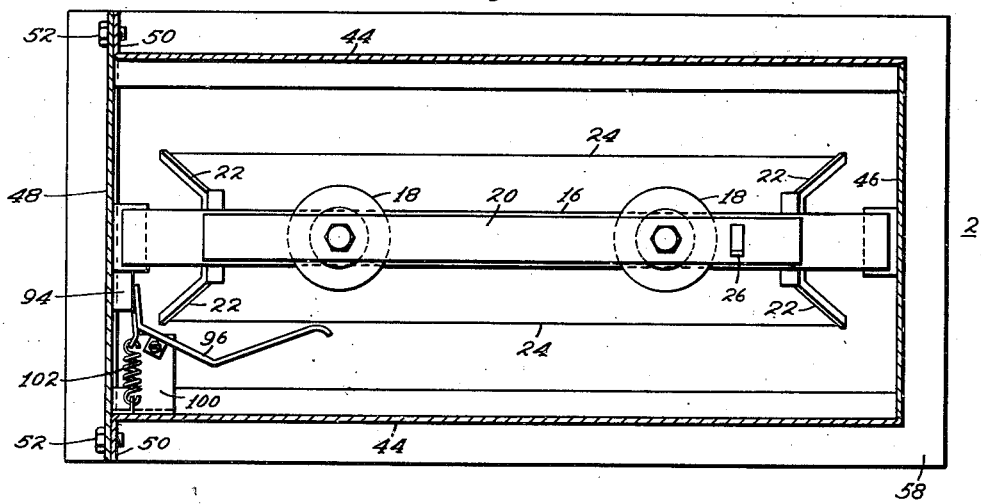
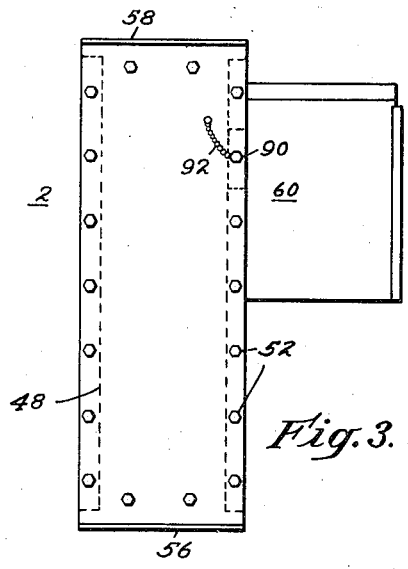
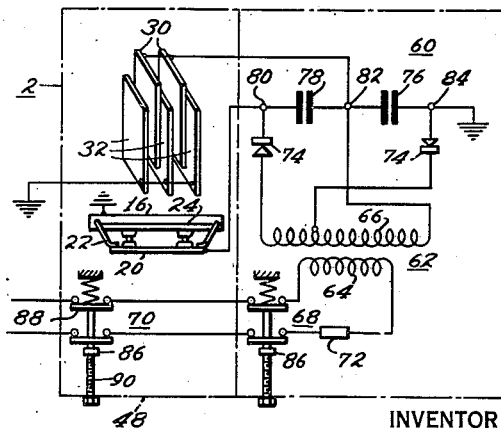

2,427,740

UNITED STATES PATENT OFFICE 2,427,740

PROTECTED ELECTRICAL DUST PRECIPITATOR

Edward H. R. Pegg, Cranford, N. J., assignor to Westinghouse Electric Corporation, East Pittsburgh, Pa., a corporation of Pennsylvania Application August 10, 1945, Serial No. 610,098

4 Claims. (Cl. 183—7)

1

This invention relates particularly to small electrical dust-precipitators for use in homes or other places where there is a likelihood of the electrical dust-precipitator being tampered with or serviced by inexperienced persons.

Electrical dust-precipitators of the type described in the Penney Patent No. 2,129,783, dated September 13, 1938, require voltages which are high and dangerous in comparison to the conventional voltages provided for commercial and industrial establishments, and for homes and the like. The high voltages are customarily obtained from the available power supply through the use of a power-pack or similar apparatus which includes a step-up transformer, rectifiers, and capacitors for storing electrical energy. The high voltage or voltages derived from the power-pack are applied to the relatively high-potential electrodes of the electrical dust-precipitator. These insulated electrodes may include plates which are alternately arranged with uninsulated plates to form a dust-precipitating means. Electrically, this arrangement provides a capacitor which is also an energy storing device.

An object of my invention is to provide an electrical dust-precipitator of a type described which is of small size, especially one with its gas-cleaning means contained within a casing having a closable opening through which the gas-cleaning means may be passed. The door or closure for the opening can be conveniently opened to permit access to the inside of a casing and hence to the gas-cleaning means. In accordance with my invention, apparatus of this kind is provided with means operable so long as the closure is open for interrupting the energizing circuit to the apparatus, for dissipating the energy that may be stored in the energy storing means of the apparatus, and for preventing high potential on the insulated electrodes.

Other features, objects and innovations of my invention will be discernible or obtainable from the following description of a preferred embodiment thereof, and the accompanying drawings which indicate the essential parts of my invention. In the drawings:

Fig. 2 is a sectional view substantially along the lines II—II of Fig. 1;

Fig. 3 is an elevation view at right angles to Fig. 1 with a power-pack added to the casing; and

2

Figure 1:
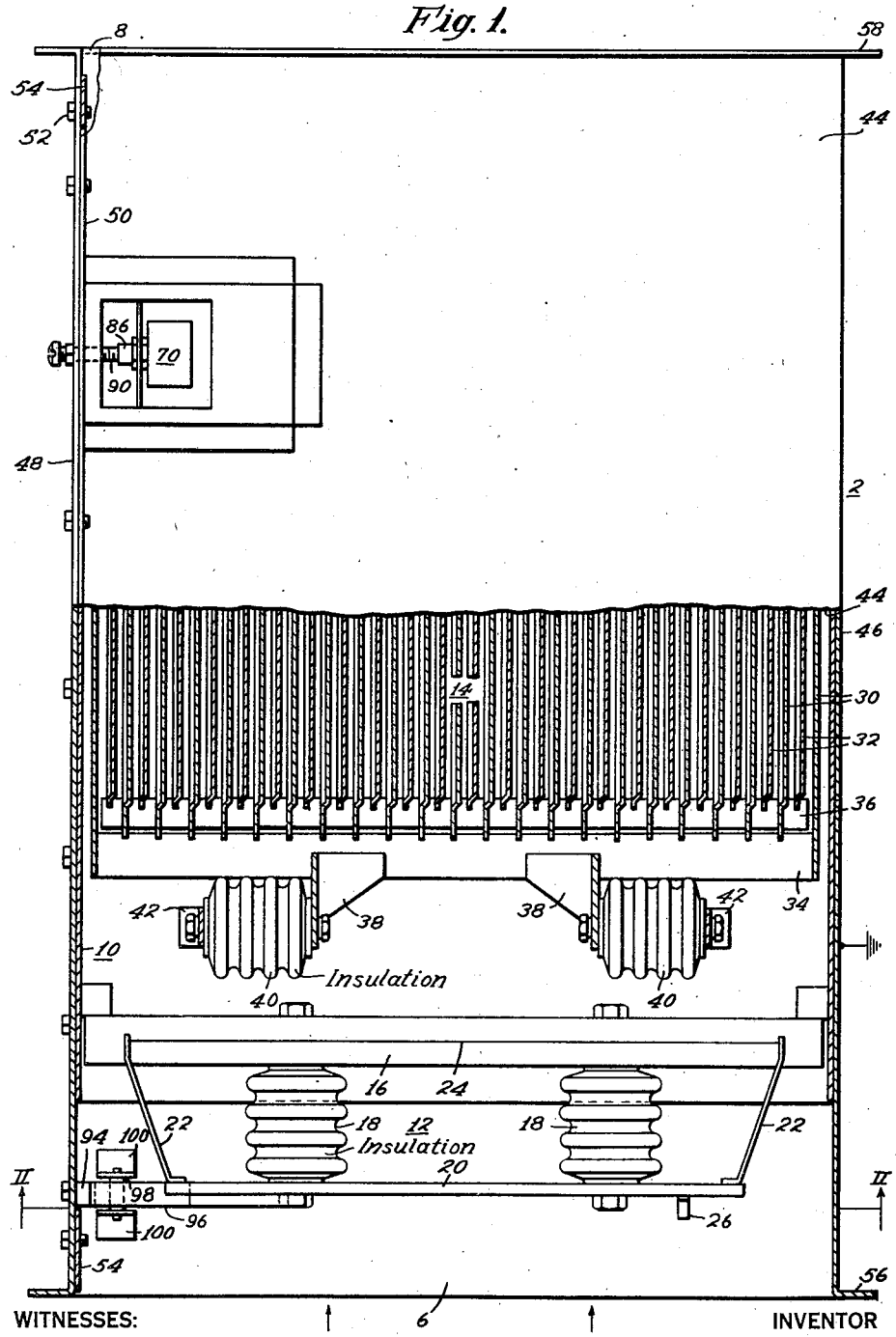
Figure 1 is a view, partly in section and partly in elevation, of an apparatus in accordance with my invention.

Fig. 4 is a schematic wiring diagram for the electrical parts of the electrical dust-precipitator.

Referring to the drawings, an open-ended rectangular metal casing or cabinet, indicated in its entirety by the reference numeral 2, supports an air cleaning means therein between an inlet opening 6 and an outlet opening 8 at the ends of the casing. The air cleaning means is along the lines shown in my Patent No. 2,215,298 of September 17, 1940, but any other suitable apparatus may be used. The air cleaning means comprises a rectangular metal housing 10 in which is supported a downstream dust-charging means 12 and an upstream dust-precipitating means 14. Briefly, the ionizing means comprises an uninsulated ground electrode 16 secured to walls of the housing 10 and supporting a pair of spaced insulators 18 which, in turn, support an insulated bar 20 spanning the space between them. Arms 22 extend from opposite ends of the bar 20 for insulatedly supporting an ionizing wire 24 on each side of the ground electrode 16. The ionizing wires are in discharging relation to the ground electrode 16 and other grounded parts on the other side of the wires. A terminal 26 is provided to which a high potential conductor may be connected for applying the necessary high voltage between the insulated ionizing wires and the associated uninsulated electrodes to which they discharge. Such a conductor may insulatedly pass through any suitable hole in the casing.

The dust-precipitating means 14 comprises a plurality of relatively insulated and uninsulated plates 30 and 32, respectively, held in parallel closely spaced relation by a plurality of spacing bars 34 for the insulated plate electrodes, and spacing bars 36 for the uninsulated plate electrodes. The bars 34 are carried by transverse bars 38, which in turn are insulatedly carried by insulators 40 supported on bars 42 secured to the housing 10. The bars 36 are secured directly to the housing.

The casing 2 comprises spaced side walls 44, a back wall 46 and a front wall 48 which, in this instance, also functions as a closure of the casing. The side walls 44 are provided with flanges 50, coextensive with the front closure 48, having spaced threaded holes for receiving a plurality of spaced screws 52 passing through over-size holes around the periphery of the closure, for bolting the closure in place. Upper and lower cross bars 54 are provided on the casing for receiving the bolts on a line between the flanges 50.

The edges of the casing are also provided with flanges 56 defining the opening 6, and flanges 58 defining the opening 8. These flanges 56 and 58 are adapted to receive conduits through which air is fed into and removed from the casing. Metallic screening can also be provided across the flanges so as to prevent accidental contact with the high potential electrodes of the dust-charging means 12 or the dust-precipitating means 14. Preferably, the casing side walls are of sufficient length to extend beyond the insulated parts in the housing 10, a distance sufficient to provide adequate air insulation to any metal across the flanges 56 and 58.

The insulated electrodes are energized through a power-pack 60 which may be attached to a side of the casing 2. The power-pack is generally in the form of a completely closed housing having a door or closure for permitting access thereto. Within the power-pack, a step-up transformer 62 is provided having a low-voltage primary 64 and a high-voltage secondary 66. The primary 64 is in the primary energizing circuit which includes a door operated switch 68, an operable switch 70, and a thermally responsive switch 72. The switch 68 is closed when the door of the power-pack is closed and is open and remains open so long as this door is not closed. The switch 72 interrupts the primary circuit when it becomes too hot as would be the case in the event that excess current flows in the primary circuit.

The secondary 66 is in a secondary circuit which includes a pair of rectifiers 74 and a pair of series-connected capacitors 76 and 78. The circuit is such that a high direct-current potential is available at point 80, an intermediate potential at point 82 and ground potential at point 84. The point 80 is electrically connected to an insulated conductor leading to the terminal 26, and the point 82 is similarly connected through suitable means to charge the insulated plate electrodes 30. The uninsulated electrodes are grounded through the housing 10 and casing 2, so as to be at the potential of the casing or point 84.

The switch 70 is of any suitable type which is normally open and which contains a push button or similar mechanism 86 for closing its contacts 88 which are in the primary circuit. The push button 86 is arranged to be operated by a long bolt 90 which passes through the front closure 48 and threads through a hole in the flange 50 in a side wall 44. A chain 92 may be provided around the head of the bolt 90, the chain being fastened to the front closure 48 so that the bolt cannot be lost or misplaced.

Referring particularly to the bottom of Fig. 1 and to Fig. 2, the front closure 48 is also provided with a unitary metal block 94 adapted to slidably engage an end of a first class metal lever 96 which is pivoted on a metal shaft 98 held in position by two spaced metal brackets 100 secured to a side wall 44 of the casing 2. When the closure 48 is closed, the block 94 causes the lever 96 to pivot about the shaft 98, and move the other end of the lever away from the bar 20, introducing a suitable air space therebetween for adequate insulation. When the closure is opened, a tension spring 102, having an end secured to a side wall 44 and another end secured to an end of the lever 96 on the side of the block 94, forces the lever counterclockwise with respect to Fig. 2 until it contacts the insulated bar 20, thereby grounding it and the circuits connected thereto. This grounding mechanism maintains the insulated ionizing structure at ground potential so long as the closure 98 is open. If the primary circuit should be accidentally closed while the grounding mechanism is grounded to the bar 20, the primary 64 will draw an excessive current which will cause the switch 72 to open.

The protective scheme of my invention is evident. When the closure is first applied, the block 94 causes the lever 96 to move out of contact with the insulated bar 20. Inserting the bolt 90, in securing the closure, requires a little time but ultimately it engages the push button 86 for closing the switch 70 in the primary circuit. This circuit is connected in any suitable manner to the conventional power supply, and if the other switches in the circuit are closed, the transformer 62 will be energized so that a high potential, in the order of 12,000–13,000 volts, will be applied to the ionizing wires and a high potential, in the order of 5,000–6,000 volts, will be applied to the insulated plate electrodes.

When the closure is to be opened it is necessary to release the bolt 90. The first movement of this bolt opens the switch 70, thereby deenergizing the primary circuit and the transformer 62 so that the insulated electrodes, consisting of the ionizing wires 24 and the plate electrodes 30, will tend to lose their high potential, depending on the rate with which the charge on them leaks off. The secondary winding 66, and the inherent resistances of the capacitors provide leakage paths. However, suitable devices with high resistance may be connected across the capacitors 76 and 78, if desired. In a good design, the capacitors 76 and 78 tend to maintain the high potential at the points 80 and 82 for a short time after the transformer has been deenergized. After the opening of the switch 70, subsequent movement of the bolt 90 out of the flange 50, provides additional time for the energy storage devices to discharge; and when the closure 48 is opened or removed after the screws 52 and bolt 90 are removed, the lever 96 pivots to contact the bar 20 and provide a complete short circuit around the two capacitors 76 and 78 in series.

While I have described my invention in a form which is now preferred, it is evident that it is applicable to other embodiments and constructions.

I claim as my invention:

1. An electrical dust-precipitator comprising, in combination, a metallic casing having a gas-inlet opening, a gas-outlet opening and an opening for permitting access to the interior of the casing, said casing having a movable closure for said access-opening; gas-cleaning means within said casing, comprising dust-charging and dust-precipitating means comprising a plurality of insulated high-potential electrodes and a plurality of uninsulated electrodes, accessible through said access-opening; means for oppositely charging said insulated and uninsulated electrodes, comprising a transformer provided with a high voltage secondary circuit and a low voltage primary circuit; a switch means for controlling the energization of said primary circuit; operating means for said switch means; and grounding means operated when said closure is moved to open position for conductively connecting certain of said insulated electrodes to said casing; said closure interlocking said switch operating means and said grounding means so that the former causes said switch means to deenergize said primary circuit before the grounding means conductively connects the insulated electrodes to the casing.

2. The invention of claim 1 characterized by said primary circuit including a current-responsive thermally-operated switch means.

3. An electrical dust-precipitator comprising, in combination, a metallic casing having a gas-inlet opening, a gas-outlet opening, and an opening for permitting access to the interior of the casing, said casing having a movable closure for said access-opening, gas-cleaning means within said casing, comprising dust-charging and dust-precipitating means, comprising insulated high-potential electrodes including plate-electrodes and uninsulated electrodes including plate-electrodes forming a capacitor with the first said plate-electrodes, said electrodes being accessible through said access-opening, means for oppositely charging said insulated and uninsulated electrodes, comprising a transformer provided with a high voltage secondary circuit and a low voltage primary circuit including a current-responsive thermally-operated switch means, said secondary circuit including capacitors electrically connected across said insulated and uninsulated electrodes, and protective means, associated directly with said closure, operable before said closure can be moved to a position permitting access to the interior of the casing, for interrupting said primary circuit, said closure being operable on said protective means, after said primary circuit has been interrupted as aforesaid, for making an electrical conductive connection between said insulated electrodes and said casing, said protective means being operable as said closure is being restored to closing position for first interrupting said connection and for thereafter restoring the interrupted primary circuit.

4. An electrical dust-precipitator comprising, in combination, a metallic casing having a gas-inlet opening, a gas-outlet opening and an opening for permitting access to the interior of the casing, said casing having a movable closure for said access-opening, gas-cleaning means within said casing, comprising dust charging and dust-precipitating means comprising a plurality of insulated high-potential electrodes and a plurality of uninsulated electrodes, insulated supporting means for insulatedly supporting a plurality of said high-potential electrodes, means for oppositely charging said insulated and uninsulated electrodes, comprising a transformer provided with a high voltage secondary circuit and a low voltage primary circuit, a switch for controlling the energization of said primary circuit, operating means for said switch, associated with said closure, operable when said closure is moved to open and closed positions, a pivoted leverage mechanism inside of said casing and directly electrically connected thereto, said mechanism being operable by said closure moving to open position, for making a conductive connection between said supporting means and said casing, and being operable by said closure moving to closing position for interrupting said connection.

EDWARD H. R. PEGG.

REFERENCES CITED

The following references are of record in the file of this patent:

UNITED STATES PATENTS

| Number | Name | Date |
| --- | --- | --- |
| 2,233,639 | Pegg | Mar. 4, 1941 |
| 2,129,783 | Penney | Sept. 13, 1938 |

FOREIGN PATENTS

| Number | Country | Date |
| --- | --- | --- |
| 411,194 | Great Britain | June 7, 1934 |